United States Patent
Chung et al.

(10) Patent No.: US 10,508,197 B2
(45) Date of Patent: Dec. 17, 2019

(54) THERMOPLASTIC VULCANIZATE COMPOSITIONS

(71) Applicant: ExxonMobil Chemical Patents Inc., Baytown, TX (US)

(72) Inventors: Oscar O. Chung, Wales (GB); Eugene R. Uhl, Massillon, OH (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 16/213,340

(22) Filed: Dec. 7, 2018

(65) Prior Publication Data

US 2019/0106560 A1    Apr. 11, 2019

Related U.S. Application Data

(62) Division of application No. 15/507,957, filed as application No. PCT/US2015/048364 on Sep. 3, 2015, now Pat. No. 10,196,508.

(60) Provisional application No. 62/068,057, filed on Oct. 24, 2014.

(51) Int. Cl.
| | |
|---|---|
| *C08L 23/10* | (2006.01) |
| *C08L 23/16* | (2006.01) |
| *C08J 3/22* | (2006.01) |
| *C08J 3/24* | (2006.01) |
| *C08K 3/22* | (2006.01) |
| *C08K 3/04* | (2006.01) |
| *C08L 23/12* | (2006.01) |
| *C09C 1/48* | (2006.01) |

(52) U.S. Cl.
CPC .............. *C08L 23/16* (2013.01); *C08J 3/226* (2013.01); *C08J 3/246* (2013.01); *C08K 3/04* (2013.01); *C08K 3/22* (2013.01); *C08L 23/10* (2013.01); *C08L 23/12* (2013.01); *C09C 1/48* (2013.01); *C08J 2323/16* (2013.01); *C08J 2423/04* (2013.01); *C08J 2423/10* (2013.01); *C08K 2003/2296* (2013.01); *C08L 2205/03* (2013.01); *C08L 2312/04* (2013.01)

(58) Field of Classification Search
CPC ...... C08L 23/16; C08L 23/12; C08L 2312/04; C08L 23/10; C08J 3/226; C08J 3/246; C08K 3/04; C08K 3/22; C08K 2003/2296; C09C 1/48
See application file for complete search history.

(56) References Cited

U.S. PATENT DOCUMENTS

| | | |
|---|---|---|
| 4,130,535 A | 12/1978 | Coran et al. |
| 4,594,390 A | 6/1986 | Abdou-Sabet et al. |
| 6,147,160 A | 11/2000 | Wang et al. |
| 7,622,528 B2 | 11/2009 | Chung et al. |
| 7,935,763 B2 | 5/2011 | Chung et al. |
| 2007/0083007 A1* | 4/2007 | Jacob ............... C08J 9/0061 525/88 |
| 2013/0056123 A1 | 3/2013 | Tomoi et al. |

FOREIGN PATENT DOCUMENTS

| | | |
|---|---|---|
| JP | H08-253634 A | 10/1996 |
| JP | 2012/117018 A | 6/2012 |
| WO | 2003/059963 | 7/2003 |
| WO | 2006/101924 A | 9/2006 |

\* cited by examiner

*Primary Examiner* — Nathan M Nutter
(74) *Attorney, Agent, or Firm* — Chad A. Guice

(57) ABSTRACT

In methods for forming thermoplastic vulcanizates, and thermoplastic vulcanizates formed by such methods, a masterbatch comprising one or more additives in a carrier resin comprising propylene- or ethylene-based copolymer is added to the thermoplastic vulcanizate formulation. The resulting thermoplastic vulcanizate may additionally be passed through a 200 mesh or finer screen and thereafter extruded. The thermoplastic vulcanizates may exhibit increased extrusion throughput rates and enhanced surface smoothness.

10 Claims, 1 Drawing Sheet

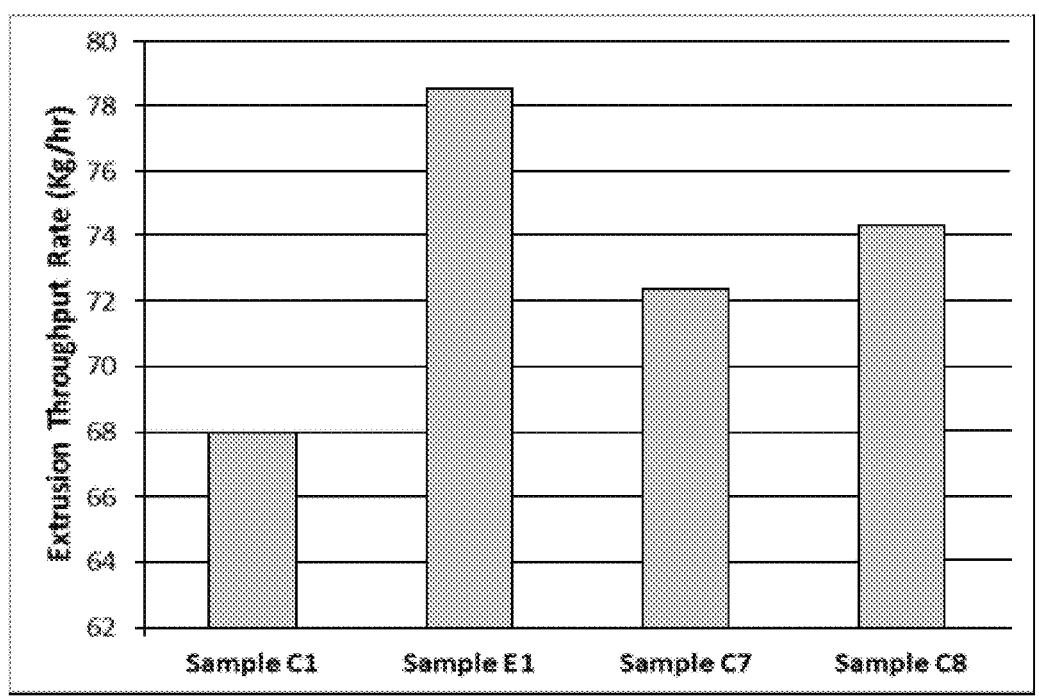

THERMOPLASTIC VULCANIZATE COMPOSITIONS

PRIORITY CLAIM TO RELATED APPLICATIONS

This application is a divisional of U.S. Ser. No. 15/507,957 filed Mar. 1, 2017, which is a National Phase Application claiming priority to PCT Application Serial No. PCT/US2015/048364 filed Sep. 3, 2015, and U.S. Provisional Application Ser. No. 62/068,057, filed Oct. 24, 2014, the disclosures of which are fully incorporated herein by their reference.

FIELD OF THE INVENTION

This invention relates to compositions for forming, and compositions comprising, thermoplastic vulcanizates, particularly thermoplastic vulcanizates incorporating additives. In addition, this invention relates to methods of forming the aforementioned compositions.

BACKGROUND OF THE INVENTION

Thermoplastic vulcanizates ("TPVs") are a class of thermoplastic compositions that include finely dispersed cross-linked elastomer particles forming a disperse phase in a continuous thermoplastic phase. TPVs have the benefit of the elastomeric properties provided by the elastomer phase, with the processability of thermoplastics. TPVs may be produced by a process that includes dynamic vulcanization—a process of selectively crosslinking (otherwise referred to alternatively as curing or vulcanizing) the elastomer component during its melt mixing with the molten thermoplastic under intensive shear and mixing conditions within a blend of at least one non-vulcanizing thermoplastic polymer component while at or above the melting point of that thermoplastic. See, for example U.S. Pat. Nos. 4,130,535; 4,594,390; 6,147,160; 7,622,528; and 7,935,763, the entirety of each of which is incorporated by reference herein.

Conventional plastic processing equipment can extrude, inject, or otherwise mold, and thus press and shape, TPVs into useful products. These thermoplastic vulcanizates can be made light in weight and attractive, with good durability, and can be reprocessed at the end of their product life to produce a new product. For these reasons, thermoplastic vulcanizates are widely used in industry, for example as auto parts, such as dashboards and bumpers, air ducts, weatherseals, fluid seals, and other under the hood applications; as gears and cogs, wheels and drive belts for machines; as cases and insulators for electronic devices; as fabric for carpets, clothes and bedding and as fillers for pillows and mattresses; and as expansion joints for construction. They are also widely used in consumer goods, being readily processed, capable of coloration as with other plastics, and providing elastic properties that can endow substrate materials, or portions thereof, for instance harder plastics or metals, in multi-component laminates, with a "soft touch" or rebound properties like rubber.

Thermoplastic vulcanizates can be prepared by dynamic vulcanization in Banbury mixers, roll mixers and other types of shearing, melt processing mixers. Because of the advantages of a continuous process, such materials can be prepared in single screw or multi-screw extruders.

The environment in which thermoplastic vulcanizates are formed and in which vulcanization of the rubber constituent occurs is typically defined by significant shearing forces, heat, and the presence of a variety of additives, including rubber curing agents and co-agents that facilitate cross-linking of the rubber. The processing conditions and selection of materials to be included in the TPV can materially impact the quality of the TPV on extrusion. It is desirable to provide TPVs that exhibit good physical properties and processability, while maintaining excellent extrusion properties. However, balancing these desirable characteristics has proven difficult. Extrusion surface smoothness (which may also refer to as extrusion surface roughness (ESR)) is a particularly important extrusion property as the ESR may dictate the suitability and aesthetics of a final extruded product. At the same time, there continues to be significant room for improvement of TPV processability, such as extrusion throughput rate. Thus, it is desirable when formulating and processing TPVs to maintain or improve ESR in combination with efforts to improve physical properties and processability, such as extrusion throughput rate.

The present invention is directed to compositions and methods for improvement of processability of TPVs, including extrusion throughput rate, while also maintaining or improving physical characteristics such as surface smoothness. In certain embodiments, the invention provides TPVs, and methods for making TPVs, that include an at least partially cross-linked elastomer forming a disperse phase within a continuous phase thermoplastic resin, and that further include a masterbatch additive. The masterbatch additive may include carbon black and/or another additive or additives dispersed in a carrier resin. Carbon black, for example, is typically used to impart a black color to a TPV, and may also impart UV-resistant properties to the TPV. Although carbon black and/or other additive(s) may be dispersed within a polypropylene carrier resin to form the masterbatch to be added to the TPV, the present inventors have surprisingly found that propylene- or ethylene-based copolymers are superior carrier resins for masterbatches incorporated into TPVs. In particular, when certain propylene- or ethylene-based copolymers are used as carrier resins in a masterbatch added to TPV formulations, the resulting TPVs exhibit enhanced surface smoothness and faster extrusion throughput, among other beneficial properties. Even more surprisingly, these effects are enhanced even as compared to TPVs that include propylene- or ethylene-based copolymers blended directly into the TPV formulation.

SUMMARY OF THE INVENTION

Accordingly, the present invention in one aspect provides a process for producing a thermoplastic vulcanizate, in which a TPV formulation comprising an elastomer component, curing composition, and thermoplastic resin is processed to form a TPV. Processing may include dynamic vulcanization of the elastomer component such that it becomes at least partially cross-linked and dispersed within a continuous phase comprising the thermoplastic resin. In some aspects, carbon black is added to the TPV formulation during processing via a carbon black masterbatch comprising carbon black dispersed in propylene- or ethylene-based copolymer carrier resin. In other aspects, one or more other additives are added to the TPV formulation during processing via one or more additive masterbatches, each additive masterbatch comprising one or more of the one or more other additives dispersed in propylene- or ethylene-based copolymer carrier resin. A masterbatch may be added to the TPV formulation before, during, or after dynamic vulcanization. In certain aspects, the process may further include extruding the TPV formulation through a 200 mesh or finer screen, which may further enhance surface smoothness.

As used herein, a "TPV formulation" refers to the mixture of ingredients blended or otherwise compiled before or during processing of the TPV formulation in order to form a TPV. This is in recognition of the fact that the ingredients that are mixed together and then processed may or may not be present in the final TPV in the same amounts added to the formulation, depending upon the reactions that take place among some or all of the ingredients during processing of the mixed ingredients.

The present invention in other aspects may include forming a masterbatch comprising one or more additives dispersed in a propylene- or ethylene-based copolymer carrier resin, and blending the masterbatch, an elastomer component, and a thermoplastic resin to form a TPV formulation. The one or more additives of the masterbatch in particular aspects comprise, or alternatively consist of, carbon black. The blending may include dynamic vulcanization of the elastomer component in the thermoplastic resin before, during, or after addition of the masterbatch. The blended TPV formulation may further be extruded or otherwise processed to obtain a TPV comprising the one or more additives, propylene- or ethylene-based copolymer, elastomer component, and thermoplastic resin, such that the elastomer component is at least partially vulcanized and dispersed within a continuous phase comprising the thermoplastic resin. Extrusion or other processing may in some aspects include passing the TPV formulation through a 200 mesh or finer screen.

In yet further aspects, the invention provides a TPV formed by any of the aforementioned processes. In other aspects, the invention provides a TPV comprising an at least partially cross-linked elastomer component dispersed within a thermoplastic resin, carbon black and/or other additive(s), and a propylene- or ethylene-based copolymer, wherein the propylene- or ethylene-based copolymer is incorporated into the TPV as a carrier resin of the carbon black and/or other additive(s). Alternatively or in addition, the TPV of certain aspects may be characterized as the product resulting from dynamic vulcanization of a composition comprising a vulcanizable elastomer component, a thermoplastic resin, a curing composition, and a masterbatch comprising carbon black (and/or other additive(s)) dispersed in a propylene- or ethylene-based copolymer carrier resin.

BRIEF DESCRIPTION OF THE DRAWINGS

The FIGURE is a chart indicating extrusion throughput rates of various thermoplastic vulcanizate formulations.

DETAILED DESCRIPTION OF THE EMBODIMENTS

As will be described in greater detail below, the present invention describes TPVs, and processes for forming TPVs that include addition of a masterbatch comprising one or more additives dispersed in a propylene- or ethylene-based copolymer carrier resin. In particular embodiments, the masterbatch is a carbon black masterbatch comprising carbon black dispersed in the propylene- or ethylene-based copolymer resin. The masterbatch of various embodiments is suitable for inclusion in any TPV during manufacture of the TPV. Certain embodiments provide a method comprising dynamically vulcanizing a TPV formulation so as to form a TPV. The TPV formulation may comprise an elastomer component, a thermoplastic resin, a curing composition, and a masterbatch comprising one or more additives (e.g., carbon black) dispersed in a propylene- or ethylene-based copolymer. The TPV formulation may be processed, including by dynamic vulcanization, to form a TPV comprising (i) the elastomer component at least partially cross-linked and dispersed within a continuous phase of the thermoplastic resin, (ii) the one or more additives, (iii) the propylene- or ethylene-based copolymer carrier resin of the one or more additives, and (iv) any byproducts of the dynamic vulcanization reaction and/or any unreacted curing composition. In alternative embodiments, the masterbatch may be added during processing but after dynamic vulcanization. In certain embodiments, other additives (besides the one or more additives in the previously-referenced masterbatch) may be included during processing, before or after the dynamic vulcanization, either as direct additions or as additions through additional masterbatches (which may comprise a conventional carrier resin or a propylene- or ethylene-based copolymer carrier resin).

Each component of the TPV formulations of some embodiments will be discussed in greater detail below, followed by description of the processing employed to form TPVs according to various embodiments.

Elastomer Component

Any elastomer suitable for use in the manufacture of TPVs can be used to manufacture the TPVs of some embodiments of the present invention. The term "elastomer" refers to any natural or synthetic polymer exhibiting elastomeric properties, any may be used herein synonymously with "rubber." The elastomer component of TPVs provided herein should be capable of being vulcanized (i.e., cured or cross-linked). Exemplary elastomers for use in accordance with the present invention may include unsaturated non-polar elastomers, monoolefin copolymer elastomers comprising non-polar, elastomer copolymers of two or more monoolefins (EP elastomer), which may be copolymerized with at least one polyene, usually a diene (EPDM elastomer). EPDM (ethylene-propylene-diene elastomer) is a polymer of ethylene, propylene and one or more non-conjugated diene(s), and the monomer components may be polymerized using Ziegler-Natta, metallocene, or other organometallic compound catalyzed reactions. In the event that the copolymer is prepared from ethylene, alpha-olefin, and diene monomers, the copolymer may be referred to as a terpolymer or even a tetrapolymer in the event that multiple olefins or dienes are used.

Satisfactory non-conjugated dienes include 5-ethylidene-2-norbornene (referred to as ENB or EP(ENB)DM); 1,4-hexadiene (HD); 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; dicyclopentadiene (DCPD); 5-vinyl-2-norbornene (referred to as VNB or EP(VNB)DM); divinyl benzene, and the like, or combinations thereof. Such elastomers have the ability to produce thermoplastic vulcanizates with a cure state generally in excess of about 95 percent while maintaining physical properties attributable to the crystalline or semi-crystalline polymer. EP elastomer and EPDM elastomer with intrinsic viscosity ($\eta$) measured in Decalin at 135° C. between 0.1 to 10 dl/gram are preferred. In a particularly preferred embodiment, the elastomer comprises EPDM.

The elastomeric copolymers may contain from about 20 to about 90 mole percent ethylene units derived from ethylene monomer. Preferably, these copolymers contain from about 40 to about 85 mole percent, and even more preferably from about 50 to about 80 mole percent ethylene units. Furthermore, where the copolymers contain diene units, the diene units can be present in an amount from about 0.1 to about 5 mole percent, preferably from about 0.1 to about 4 mole percent, and even more preferably from about 0.15 to about 2.5 mole percent. The balance of the copolymer will generally be made up of units derived from alpha-olefin monomers. Accordingly, the copolymer may contain from about 10 to about 80 mole percent, preferably from about 15 to about 50 mole percent, and more preferably from about 20 to about 40 mole percent alpha-olefin units derived from alpha-olefin monomers. The foregoing mole percentages are based upon the total moles of the polymer.

The elastomer component may comprise any one or more other suitable elastomeric copolymer capable of being at least partially vulcanized, such as butyl elastomers, natural rubbers, and any other elastomer (synthetic or natural) suitable for inclusion in a TPV, including those disclosed in U.S. Pat. Nos. 7,935,763 and 8,653,197, the entirety of each of which is hereby incorporated by reference.

Elastomers, especially those in the high end of the molecular weight range, are often oil extended in the manufacturing process and can be directly processed as such in accordance with the invention process. That is, an elastomer component included in a TPV according to some embodiments comprises both elastomer and extender oil.

Thermoplastic Resins

Any thermoplastic resin suitable for use in the manufacture of thermoplastic vulcanizates can be employed as the thermoplastic resin of various embodiments, including amorphous, crystalline, or semi-crystalline thermoplastics. In general, any thermoplastic described in U.S. Pat. No. 7,935,763, previously incorporated by reference herein, is suitable.

In particular embodiments, the thermoplastic resin may comprise one or more crystallizable polyolefins that are formed by polymerizing alpha-olefins such as ethylene, propylene, 1-butene, 1-hexene, 1-octene, 2-methyl-1-propene, 3-methyl-1-pentene, 4-methyl-1-pentene, 5-methyl-1-hexene, and mixtures thereof. For example, known ethylene-based homo- and copolymers having ethylene crystallinity are suitable. Commercial products include high density polyethylene (HDPE), linear low density polyethylene (LLDPE), and very low density polyethylene (VLDPE, or plastomers). Propylene-based homopolymers and copolymers, such as isotactic polypropylene and crystallizable copolymers of propylene and ethylene or other C4-C10 alpha-olefins, or diolefins, having isotactic propylene crystallinity, are preferred. Copolymers of ethylene and propylene or ethylene or propylene with another alpha-olefin such as 1-butene, 1-hexene, 1-octene, 2-methyl-1-propene, 3-methyl-1-pentene, 4-methyl-1-pentene, 5-methyl-1-hexene or mixtures thereof are also suitable. These will include reactor polypropylene copolymers and impact polypropylene copolymers, whether block, random or of mixed polymer synthesis.

The crystalline or semi-crystalline thermoplastics generally have a peak "melting point" ("Tm") which is defined as the temperature of the greatest heat absorption within the range of melting of the sample. The Tm of the thermoplastics of some embodiments may be within the range from a low of any one of about 40, 50, 60, 70, 75, 80, 85, 90, 95, 100, 105, 110, 115, and 120° C. to a high of any one of about 170, 180, 190, 200, 210, 220, 230, 240, 250, 260, 270, 280, 290, 300, 310, 320, 330, 340, 350° C. In particular example embodiments, the Tm is within the range from about 40° C. to about 350° C.; from about 75° C. to about 210° C.; from about 85° C. to about 180° C.; from about 90° C. to about 180° C.; or from about 120° C. to about 170° C. The glass transition temperature (Tg) of these thermoplastics is from about −25° C. to about 10° C., preferably from about −5 to about 5° C. More generally speaking, including the semi-crystalline and glassy polar thermoplastics, useful thermoplastics will have a Tg of up to and greater than 100° C., and even greater than 150° C. The characterizing temperatures are determined by DSC according to the test method of ASTM D-3418.

A thermoplastic according to particular embodiments comprises highly crystalline isotactic or syndiotactic polypropylene. This polypropylene generally has a density of from about 0.85 to about 0.91 g/cc, with the largely isotactic polypropylene having a density of from about 0.90 to about 0.91 g/cc. Also, high and ultra-high molecular weight polypropylene that has a fractional melt flow rate is highly preferred. These polypropylene resins are characterized by a melt flow rate that is from 0.2 to 3000 dg/min and more preferably less than 1.2 dg/min, and most preferably less than or equal to 0.8 dg/min per ASTM D-1238. Melt flow rate is a measure of how easily a polymer flows under standard pressure, and is measured by using ASTM D-1238 at 230° C. and 2.16 kg load.

The thermoplastic resin may furthermore contain additional components, such as any of those additional components described in U.S. Pat. No. 7,935,763 in connection with the thermoplastic resin. For instance, it may include additional non-crosslinkable elastomers, including non-TPV thermoplastics and thermoplastic elastomers. Examples include polyolefins such as polyethylene homopolymers, and copolymers with one or more $C_3$-$C_8$ alpha-olefins.

Curing Composition

A curing composition of some embodiments comprises one or more curing agents. Suitable curing agents include any of those known to those skilled in the art for processing vulcanizable elastomer, or more particularly, thermoplastic vulcanizates. Curing compositions according to various embodiments may include any curing agent and/or coagents, and may further include any method of including a curing agent and/or coagent, as discussed in U.S. Pat. No. 8,653, 197 (previously incorporated by reference herein) and in U.S. Pat. No. 8,653,170, the entirety of which is also hereby incorporated by reference.

Suitable curing agents include one or more of silicon hydrides (which may effect hydrosilation cure), phenolic resins, peroxides, free radical initiators, sulfur, zinc metal compounds, and the like. The named curatives are frequently used with one or more coagents that serve as initiators, catalysts, etc. for purposes of improving the overall cure state of the elastomer. For instance, the curing composition of some embodiments includes one or both of zinc oxide (ZnO) and stannous chloride ($SnCl_2$). The curing composition may be added in one or more locations, including the feed hopper of a melt mixing extruder. In some embodiments, the curing agent and any additional coagents may be added to the TPV formulation together; in other embodiments, one or more coagents may be added to the TPV formulation at different times from any one or more of the curing agents, as the TPV formulation is undergoing processing to form a TPV (discussed in greater detail below).

Curing agents in particular embodiments may include one or more phenolic resins. Suitable phenolic resins include those disclosed in U.S. Pat. Nos. 2,972,600; 3,287,440; 5,952,425; and 6,437,030 (each of which is incorporated by reference herein), and preferred phenolic resins include those referred to as resole resins, and discussed in detail in U.S. Pat. No. 8,653,197 (previously incorporated by reference herein). In certain embodiments in which the curing composition includes phenolic resin, the curing composition also includes one or both of ZnO and $SnCl_2$.

In addition to the ZnO and $SnCl_2$, the curing composition of some embodiments also or instead includes any other suitable co-agent, such as triallylcyanurate, triallyl isocyanurate, triallyl phosphate, sulfur, N-phenyl-bis-maleamide, zinc diacrylate, zinc dimethacrylate, divinyl benzene, 1,2-polybutadiene, trimethylol propane trimethacrylate, tetramethylene glycol diacrylate, trifunctional acrylic ester, dipentaerythritolpentacrylate, polyfunctional acrylate, retarded cyclohexane dimethanol diacrylate ester, polyfunctional methacrylates, acrylate and methacrylate metal salts, oximer for e.g., quinone dioxime, and the like.

Masterbatch

TPV formulations of the present invention may also include a masterbatch comprising one or more additives dispersed in a carrier resin comprising propylene- or ethylene-based copolymer. In some embodiments, the one or more additives may include any additive suitable for incorporation into a TPV via a masterbatch (e.g., any additive suitable for dispersion in a carrier resin, thereby forming a masterbatch which may be incorporated into a TPV). Examples include fillers, extenders, pigmentation agents, and the like. Particular examples include conventional inorganics such as calcium carbonate, clays, silica, talc, titanium dioxide, as well as organic and inorganic nanoscopic fillers.

In particular embodiments, the masterbatch comprises, consists essentially of, or consists of, carbon black dispersed in a propylene- or ethylene-based copolymer carrier resin. By "consists essentially of," it is meant with respect to the carrier resin that the properties of the carrier resin will remain within the bounds of properties of the propylene- or ethylene-based copolymers of various embodiments (discussed in greater detail below). With respect to the carbon black dispersed in the masterbatch, "consists essentially of" means that any component(s) dispersed within the carrier resin other than carbon black are of a nature (and/or a sufficiently small amount) such that the properties of the TPV formulation (and resulting TPV after processing) are no different than they would have been in the complete absence of any such additional component(s). In particular, such properties include surface smoothness and extrusion throughput rate.

Carbon Black Particles in the Masterbatch

The carbon black of the masterbatch according to some embodiments comprises particles of any conventional type of carbon black (e.g., acetylene black, channel black, furnace black, lamp black, thermal black) produced by incomplete combustion of petroleum products. Typical particle diameters may range from a low of any one of about 5, 10, 15, 20, 25, 30, 35, and 40 nm to a high of any one of about 50, 60, 70, 80, 90, 100, 110, 120, 130, 140, 150, 160, 170, 180, 190, 200, 210, 220, 230, 240, 250, 260, 270, 280, 290, 300, 310, 320, and 330 nm. Carbon black particles may form aggregates ranging in size (e.g., diameter when the aggregate is approximated as a sphere) from a low of any one of about 90, 95, 100, 105, 110, and 115 nm to a high of any one of about 200, 250, 300, 350, 400, 450, 500, 550, 600, 650, 700, 750, 800, 850, and 900 nm, and/or agglomerates ranging in size from a low of any one of about 1, 2, 3, 4, 5, 6, 7, 8, 9, and 10 microns to a high of about 90, 100, 150, 200, 250, 300, 350, and 400 microns, or larger.

In certain embodiments, the carbon black imparts UV protection and/or coloring (i.e., black pigmentation) to a TPV.

Other Additives in the Masterbatch

As noted, the masterbatch may also or instead comprise one or more other additives dispersed within the carrier resin. Again, particular examples include fillers, extenders, pigmentation agents, and the like (e.g., conventional inorganics such as calcium carbonate, clays, silica, talc, titanium dioxide, as well as organic and inorganic nanoscopic filler).

Propylene- or Ethylene-Based Copolymer Carrier Resin

The masterbatch carrier resin comprises a propylene- or ethylene-based copolymer. In general, the propylene- or ethylene-based copolymer may have (i) a density between about 0.850 and about 0.920 $g/cm^3$, or in other embodiments between about 0.860 and about 0.910 $g/cm^3$; and (ii) a melt index (MI) between about 0.05 and about 50 g/10 min, or in other embodiments between about 0.1 and about 30 g/10 min.

Density as used herein is reported at room temperature as measured in accordance with ASTM D-1505, as set forth by ASTM International as of October 2014 in ASTM D1505-10, Standard Test Method for Density of Plastics by the Density-Gradient Technique, ASTM International, West Conshohocken, Pa., 2010 (www.astm.org), the entirety of which is hereby incorporated by reference herein. MI as used herein is determined in accordance with ASTM D-1238 at 190° C. and 2.16 kg weight, as set forth by ASTM International as of October 2014 in ASTM D1238-13, Standard Test Method for Melt Flow Rates of Thermoplastics by Extrusion Plastometer, ASTM International, West Conshohocken, Pa., 2013 (www.astm.org), the entirety of which is incorporated by reference herein. Thus, any density and/or MI recited herein may be as determined in a manner consistent with each of these respective standards (ASTM D1505; ASTM D-1238).

Further, as used herein, a copolymer of propylene and ethylene is "propylene-based" when propylene-based monomers form the plurality of monomers in the copolymer, based on the total weight of the copolymer (i.e., propylene-based monomers are present in the copolymer in larger wt % than any other single monomer). Similarly, a copolymer of propylene and ethylene is "ethylene-based" when ethylene-based monomers form the plurality of monomers in the copolymer. Propylene-based copolymers will be indicated by naming propylene first (e.g., "propylene-ethylene copolymers" or "propylene-α-olefin copolymers"), and likewise for ethylene-based copolymers (e.g., "ethylene-propylene copolymers" or "ethylene-α-olefin copolymers"). A copolymer of propylene and/or ethylene may optionally include one or more additional comonomers.

In certain embodiments, the carrier resin may consist or consist essentially of the one or more propylene- or ethylene-based copolymers according to various embodiments described herein. By "consist essentially of" in this context, it is meant that the carrier resin contains no polymer other than the one or more propylene- or ethylene-based copolymers in amounts sufficient to modify the properties (particularly one or more of $H_f$, melt flow rate, and melt index) of the carrier resin compared to a carrier resin consisting of the one or more propylene- or ethylene-based copolymers.

Propylene- or ethylene-based copolymers according to certain preferred embodiments may include any one or more of: a propylene-α-olefin copolymer; an ethylene-α-olefin copolymer; and an ethylene-propylene copolymer rubber. Each will be discussed in turn in greater detail below.

Propylene-α-Olefin Copolymer Carrier Resins

In several embodiments, the carrier resin comprises or consists of a propylene-α-olefin copolymer which is a random copolymer having crystalline regions interrupted by non-crystalline regions. Not intended to be limited by any theory, it is believed that the non-crystalline regions may result from regions of non-crystallizable polypropylene segments and/or the inclusion of comonomer units. The crystallinity and the melting point of the propylene-α-olefin copolymer are reduced compared to highly isotactic polypropylene by the introduction of errors (stereo and region defects) in the insertion of propylene and/or by the presence of comonomer. The propylene-α-olefin copolymer comprises propylene-derived units and units derived from at least one of ethylene or a $C_4$-$C_{10}$ alpha-olefin, and optionally a diene-derived unit. The copolymer contains at least about 60 wt % propylene-derived units by weight of the propylene-α-olefin copolymer. In some embodiments, the propylene-α-olefin copolymer is a propylene-α-olefin copolymer elastomer having limited crystallinity due to adjacent isotactic propylene units and a melting point as described herein. In other embodiments, the propylene-α-olefin copolymer is generally devoid of any substantial intermolecular heterogeneity in tacticity and comonomer composition, and also generally devoid of any substantial heterogeneity in intramolecular composition distribution.

The propylene-α-olefin copolymer contains greater than about 50 wt %, preferably greater than about 60 wt %, more preferably greater than about 65 wt %, even more preferably greater than about 75 wt % and up to about 99 wt % propylene-derived units, based on the total weight of the propylene-α-olefin copolymer. In some preferable embodiments, the propylene-α-olefin copolymer includes propylene-derived units in an amount based on the weight of propylene-α-olefin copolymer of from about 75 wt % to about 95 wt %, more preferably about 75 wt % to about 92.5 wt %, and even more preferably about 82.5 wt % to about 92.5 wt %, and most preferably about 82.5 wt % to about 90 wt %. Correspondingly, the units, or comonomers, derived from at least one of ethylene or a $C_4$-$C_{10}$ alpha-olefin may be present in an amount of about 1 wt % to about 35 wt %, or preferably about 5 wt % to about 35 wt %, more preferably about 5 wt % to about 25 wt %, even more preferably about 7.5 wt % to about 25 wt %, even more preferably about 7.5 wt % to about 20 wt %, even more preferably from about 8 wt % to about 17.5 wt %, and most preferably about 10 wt % to 17.5 wt %, based on the total weight of the propylene-α-olefin copolymer.

The propylene-α-olefin copolymer may have a heat of fusion of about 50 J/g or less, melting point of about 100° C. or less, and crystallinity of about 2% to about 65% of isotactic polypropylene, and preferably a melt flow rate ("MFR") of less than 800 g/10 min (dg/min), as measured according to ASTM D-1238 at 230° C. and 2.16 kg weight, which is also determined as described as of October 2014 in ASTM D1238-13, Standard Test Method for Melt Flow Rates of Thermoplastics by Extrusion Plastometer, previously incorporated by reference. In particular embodiments, the propylene-α-olefin copolymer may have an MFR ranging from a low of any one of about 10, 11, 12, 13, 14, 15, 16, 17, 18, 19, and 20 g/10 min, to a high of any one of about 15, 16, 17, 18, 19, 20, 21, 22, 23, 24, 25, 26, 27, 28, 29, 30, 35, 40, 45, 50, 75, 100, 125, 150, and 200 g/10 min, provided the high is greater than or equal to the low. Thus, for example, the MFR of propylene-α-olefin copolymer according to certain embodiments may be within the range of about 15 to about 25 g/10 min, or about 18 to 22 g/10 min, or about 20 g/10 min.

Instead or in addition, a propylene-α-olefin copolymer of some embodiments may be characterized according to its melt index, as measured according to ASTM D-1238 at 190° C. and 2.16 kg weight. The propylene-α-olefin copolymer may have a melt index ranging from a low of any one of about 1.0, 1.1, 1.2, 1.3, 1.4, 1.5, 1.6, 1.7, 1.8, 1.9, 2.0, 2.5, 3.0, 3.5, 4.0, and 4.5 g/10 min to a high of any one of about 8.0, 8.5, 9.0, 9.5, 10.0, 10.5, 11.0, 11.5, 12.0, 15.0, 20.0, 30.0, 40.0, and 50.0 g/10 min.

The propylene-α-olefin copolymer may comprise more than one comonomer. Preferred embodiments of a propylene-α-olefin copolymer having more than one comonomer include propylene-ethylene-octene, propylene-ethylene-hexene, and propylene-ethylene-butene copolymers.

In some embodiments where more than one comonomers derived from at least one of ethylene or a $C_4$-$C_{10}$ alpha-olefin are present, the amount of each comonomer may be less than about 5 wt % of the propylene-α-olefin copolymer, but the combined amount of comonomers by weight of the propylene-α-olefin copolymer is about 5 wt % or greater.

In preferred embodiments, the comonomer is ethylene, 1-hexene, or 1-octene, and preferably in an amount of about 5 wt % to about 25 wt %, about 5 wt % to about 20 wt %, about 5 wt % to about 16 wt %, about 6 wt % to about 18 wt %, about 8 wt % to about 20 wt %, about 9 wt % to about 13 wt %, or in some embodiments about 10 wt % to about 12 wt % based on the weight of the propylene-α-olefin copolymer. Correspondingly, in certain of these embodiments, the propylene-α-olefin copolymer may comprise about 75 wt % to about 95 wt %, about 80 wt % to about 95 wt %, about 84 wt % to about 95 wt %, about 82 wt % to about 94 wt %, about 80 wt % to about 92 wt %, about 87 wt % to about 91 wt %, or in some embodiments about 88 wt % to about 90 wt % propylene-derived units.

In one embodiment, the propylene-α-olefin copolymer comprises ethylene-derived units. The propylene-α-olefin copolymer may comprise about 5 wt % to about 35 wt %, preferably about 5 wt % to about 25 wt %, about 7.5 wt % to about 20 wt %, about 9 wt % to about 13 wt %, about 10 wt % to about 12 wt %, or about 10 wt % to about 17.5 wt %, of ethylene-derived units by weight of the propylene-α-olefin copolymer. In some embodiments, the propylene-α-olefin copolymer consists essentially of units derived from propylene and ethylene, i.e., the propylene-α-olefin copolymer does not contain any other comonomer in an amount typically present as impurities in the ethylene and/or propylene feedstreams used during polymerization or an amount that would materially affect the heat of fusion, melting point, crystallinity, or melt flow rate of the propylene-α-olefin copolymer, or any other comonomer intentionally added to the polymerization process. In such embodiments, then, the propylene-ethylene copolymer would comprise the balance propylene-derived units in addition to ethylene-derived units in any one of the above-listed ranges.

In some embodiments, diene comonomer units are included in the propylene-α-olefin copolymer. Examples of the diene include, but not limited to, 5-ethylidene-2-norbornene, 5-vinyl-2-norbornene, divinyl benzene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, dicyclopentadiene, or a combination thereof. The amount of diene comonomer is equal to or more than 0 wt %, or 0.5 wt %, or 1 wt %, or 1.5 wt % and lower than, or equal to, 5 wt %, or 4 wt %, or 3 wt % or 2 wt % based on the weight of propylene-α-olefin copolymer.

The propylene-α-olefin copolymer has $H_f$ equal to or less than any one of about 50, 45, 40, 39, 38, 37, 36, 35, 34, 33, 32, 31, 30, 29, 28, 27, 26, 25, 24, 23, 22, 21, and 20 J/g. Suitable propylene-α-olefin copolymer of some embodiments may have a lower limit $H_f$ of any one of about 0.5, 1.0, 1.5, 2.0, 3.0, 4.0, 5.0, 6.0, and 7.0 J/g.

The propylene-α-olefin copolymer may have a percent crystallinity, as determined according to the DSC procedure described herein, of about 2% to about 65%, preferably about 0.5% to about 40%, preferably about 1% to about 30%, and more preferably about 5% to about 35%, of isotactic polypropylene. The thermal energy for the highest order of propylene (i.e., 100% crystallinity) is estimated at 189 J/g. In some embodiments, the copolymer has a crystallinity in the range of about 0.25% to about 25%, or about 0.5% to about 22% of isotactic polypropylene.

In some embodiments, the propylene-derived units of the propylene-α-olefin copolymer have an isotactic triad fraction of about 50% to about 99%, more preferably about 65% to about 97% and more preferably about 75% to about 97%. In other embodiments, the propylene-α-olefin copolymer has a triad tacticity as measured by $^{13}C$ NMR, of about 75% or greater, about 80% or greater, about 82% or greater, about 85% or greater, or about 90% or greater.

The triad tacticity of a polymer is the relative tacticity of a sequence of three adjacent propylene units, a chain consisting of head to tail bonds, expressed as a binary combination of m and r sequences. It is usually expressed as the ratio of the number of units of the specified tacticity to all of the propylene triads in the propylene-α-olefin copolymer. The triad tacticity (mm fraction) of a propylene copolymer can be determined from a $^{13}C$ NMR spectrum of the propylene copolymer. The calculation of the triad tacticity is described in the U.S. Pat. No. 5,504,172, the entire contents of which are incorporated herein by reference.

The propylene-α-olefin copolymer may have a single peak melting transition as determined by DSC. In one embodiment, the copolymer has a primary peak transition of about 90° C. or less, with a broad end-of-melt transition of about 110° C. or greater. The peak "melting point" ("$T_m$") is defined as the temperature of the greatest heat absorption within the range of melting of the sample. However, the copolymer may show secondary melting peaks adjacent to the principal peak, and/or at the end-of-melt transition. For the purposes of this disclosure, such secondary melting peaks are considered together as a single melting point, with the highest of these peaks being considered the Tm of the propylene-α-olefin copolymer. The propylene-α-olefin copolymer may have a Tm of about 100° C. or less, about 90° C. or less, about 80° C. or less, or about 70° C. or less. In one embodiment, the propylene-α-olefin copolymer has a Tm of about 25° C. to about 100° C., about 25° C. to about 85° C., about 25° C. to about 75° C., or about 25° C. to about 65° C. In some embodiments, the propylene-α-olefin copolymer has a Tm of about 30° C. to about 80° C., preferably about 30° C. to 70° C.

Differential scanning calorimetric ("DSC") data was obtained using a Perkin-Elmer DSC 7. About 5 mg to about 10 mg of a sheet of the polymer to be tested was pressed at approximately 200° C. to 230° C., then removed with a punch die and annealed at room temperature for 48 hours. The samples were then sealed in aluminum sample pans. The DSC data was recorded by first cooling the sample to −50° C. and then gradually heating it to 200° C. at a rate of 10° C./minute. The sample was kept at 200° C. for 5 minutes before a second cooling-heating cycle was applied. Both the first and second cycle thermal events were recorded. Areas under the melting curves were measured and used to determine the heat of fusion and the degree of crystallinity. The percent crystallinity (X %) was calculated using the formula, X %=[area under the curve (Joules/gram)/B(Joules/gram)] *100, where B is the heat of fusion for the homopolymer of the major monomer component. These values for B were found from the Polymer Handbook, Fourth Edition, published by John Wiley and Sons, New York 1999. A value of 189 J/g (B) was used as the heat of fusion for 100% crystalline polypropylene. The melting temperature was measured and reported during the second heating cycle (or second melt).

In one or more embodiments, the propylene-α-olefin copolymer may have a Mooney viscosity [ML (1+4)@125° C.], as determined according to ASTM D-1646, of less than 100, in other embodiments less than 75, in other embodiments less than 60, and in other embodiments less than 30. As used herein, Mooney viscosity is reported using the format: Rotor ([pre-heat time, min.]+[shearing time, min] @measurement temperature, ° C.), such that ML (1+4@125° C.) indicates a Mooney viscosity determined using the ML or large rotor according to ASTM D1646-99, for a pre-heat time of 1 minute and a shear time of 4 minutes, at a temperature of 125° C. Unless otherwise specified, Mooney viscosity is reported herein as ML(1+4@125° C.) in Mooney units according to ASTM D-1646.

The propylene-α-olefin copolymer may have a density of about 0.850 g/cm$^3$ to about 0.920 g/cm$^3$, about 0.860 g/cm$^3$ to about 0.900 g/cm$^3$, preferably about 0.860 g/cm$^3$ to about 0.890 g/cm$^3$, at room temperature as measured per ASTM D-1505.

The propylene-α-olefin copolymer may have a weight average molecular weight ("Mw") of about 5,000 to about 5,000,000 g/mole, preferably about 10,000 to about 1,000,000 g/mole, and more preferably about 50,000 to about 400,000 g/mole; a number average molecular weight ("Mn") of about 2,500 to about 2,500,00 g/mole, preferably about 10,000 to about 250,000 g/mole, and more preferably about 25,000 to about 200,000 g/mole; and/or a z-average molecular weight ("Mz") of about 10,000 to about 7,000,000 g/mole, preferably about 80,000 to about 700,000 g/mole, and more preferably about 100,000 to about 500,000 g/mole. The propylene-α-olefin copolymer may have a molecular weight distribution ("MWD") of about 1.5 to about 20, or about 1.5 to about 15, preferably about 1.5 to about 5, and more preferably about 1.8 to about 5, and most preferably about 1.8 to about 4.

The propylene-α-olefin copolymer may have an Elongation at Break of less than about 2000%, less than about 1000%, or less than about 800%, as measured per ASTM D412.

Processes suitable for preparing the propylene-α-olefin copolymer may in some embodiments include metallocene-catalyzed or Ziegler-Natta catalyzed processes, including solution, gas-phase, slurry, and/or fluidized bed polymerization reactions. Suitable polymerization processes are described in, for example, U.S. Pat. Nos. 4,543,399; 4,588,790; 5,001,205; 5,028,670; 5,317,036; 5,352,749; 5,405,922; 5,436,304; 5,453,471; 5,462,999; 5,616,661; 5,627,242; 5,665,818; 5,668,228; and 5,677,375; PCT publications WO 96/33227 and WO 97/22639; and European publications EP-A-0 794 200, EP-A-0 802 202 and EP-B-634 421, the entire contents of which are incorporated herein by reference.

Ethylene-α-Olefin Copolymer Carrier Resins

In some embodiments, the carrier resin may additionally or instead include, or consist of, one or more ethylene-α-olefin copolymers. Suitable α-olefin comonomers include any one or more of a $C_3$ to $C_{10}$ α-olefin-based monomer. In certain embodiments, the α-olefin is one or both of butene and octene (e.g., ethylene-butene and/or ethylene-octene copolymers).

In some embodiments, the ethylene-α-olefin copolymer includes ethylene-based units in an amount greater than or equal to any one of about 60, 65, 70, 75, 80, 85, 90, and 95 wt %, by weight of the ethylene-α-olefin copolymer. In certain of these embodiments, the ethylene-based unit content of the ethylene-α-olefin copolymer may have an upper limit of any one of about 99, 95, 90, 85, 80, 75, and 70 wt %, by weight of the ethylene-α-olefin copolymer, provided that the upper limit is greater than or equal to the lower limit. In some embodiments, the comonomer is present in an amount greater than or equal to any one of about 1, 5, 10, 15, 20, 25, and 30 wt %, by weight of the ethylene-α-olefin copolymer; and in an amount less than or equal to any one of about 40, 35, 30, 25, 20, 15, 10, and 5 wt %, by weight of the ethylene-α-olefin copolymer, provided that the upper limit is greater than or equal to the lower limit.

The ethylene-α-olefin copolymer of some embodiments has a density of about 0.850 to about 0.920 g/cm$^3$. In certain embodiments, the ethylene-α-olefin copolymer has a density within the range of about 0.865 to about 0.910 g/cm$^3$, or from about 0.8675 to about 0.910 g/cm$^3$. In various embodiments, the ethylene-α-olefin copolymer may have a density within the range of any one of about 0.850, 0.860, 0.865, 0.870, 0.875, 0.880, and 0.885 g/cm$^3$ to any one of about 0.900, 0.905, 0.910, 0.915, and 0.920 g/cm$^3$. Densities are determined in a manner consistent with ASTM D-1505, at room temperature, as with all other recited densities herein.

In addition, the ethylene-α-olefin copolymers according to such embodiments may have a melt index within the range of about 0.4 g/10 min to about 40 g/10 min, or from about 0.5 g/10 min to about 30 g/10 min. Melt index of an ethylene-α-olefin copolymer according to certain of these embodiments falls within the range of any one of about 0.4, 0.5, 0.6, 0.7, 0.8, 0.9, 1.0, 1.1, 1.2, 1.3, 1.4, and 1.5 g/10 min to any one of about 3, 4, 5, 6, 7, 8, 9, 10, 11, 12, 13, 14, 15, 20, 25, 30, 35, and 40 g/10 min. These MIs are, as elsewhere in this disclosure, determined in a manner consistent with ASTM D1238, at 190° C. and 2.16 kg weight.

An ethylene-α-olefin of certain embodiments may be an ethylene-octene copolymer having both a density falling within the range of about 0.865 to about 0.900 g/cm$^3$, and a MI falling within the range of about 0.5 to about 4.0 g/10 min. The ethylene-α-olefin copolymer of other particular embodiments may be an ethylene-butene and/or an ethylene-hexene copolymer having both a density falling within the range of about 0.870 to about 0.910 g/cm$^3$, and a MI falling within the range of about 1.0 to about 30.0 g/10 min. And the ethylene-α-olefin copolymer of yet other particular embodiments may be an ethylene-octene copolymer having both a density falling within the range of about 0.880 to about 0.910 g/cm$^3$ and a MI falling within the range of about 1.0 to about 30.0 g/10 min.

Examples of suitable ethylene-α-olefin copolymers include Exact™ ethylene-based copolymers commercially available from ExxonMobil Chemical Company, Houston, Tex., including Exact™ ethylene-butene copolymers and Exact™ ethylene-octene copolymers.

Ethylene-Propylene Rubber Carrier Resins

In some embodiments, the carrier resin may also or instead include one or more ethylene-propylene rubbers ("EP rubbers"). Optionally, the EP rubber may include one or more diene-based monomers. For instance, the EP rubber of some embodiments may be an EPDM terpolymer.

The EP rubber of certain embodiments includes ethylene-based units in an amount greater than or equal to any one or more of about 45, 50, 55, 60, and 65 wt %, and in an amount less than or equal to any one or more of about 55, 60, 65, 70, 75, 80, and 85 wt %, by weight of the EP rubber, provided that the upper limit is greater than or equal to the lower limit.

The EP rubber may have diene content (e.g., amount of diene-derived comonomers) within the range of about 0 wt % to about 10.0 wt %, by weight of the EP rubber. In particular embodiments, the diene content may be greater than or equal to any one of about 0.0, 0.5, 1.0, 1.5, 2.0, 2.5, 3.0, 3.5, 4.0, 4.5, and 5.0 wt %, and less than or equal to any one of about 3.0, 3.5, 4.0, 4.5, 5.0, 5.5, 6.0, 6.5, 7.0, 7.5, 8.0, 8.5, 9.0, 9.5, and 10.0 wt %, by weight of the EP rubber, provided the upper limit is greater than or equal to the lower limit.

In particular embodiments, the EP rubber may have a density within the range of about 0.850 to about 0.885 g/cm$^3$, or from about 0.860 to about 0.880 g/cm.$^3$ In addition, EP rubbers according to such embodiments may have a MI within the range of about 0.05 to about 1.1 g/10 min, or about 0.1 to about 1.0 g/10 min. Density and MI are determined in a manner consistent with ASTM D-1505 (room temperature) and ASTM D-1238 (190° C., 2.16 kg), respectively.

Masterbatch Formation

Returning now to the masterbatch, it may be formed by any suitable process for blending one or more additive (e.g., carbon black) particles with, and dispersing such particles in, a carrier resin. For instance, the additive particles and carrier resin may be dry blended and the mixture subsequently melt-mixed at a temperature above the melting temperature of the carrier resin, either directly in an extruder used to make the finished article, or by pre-melt mixing in a separate mixer (for example, a Banbury™ mixer). Dry blends of the masterbatch can also be directly injection molded without pre-melt mixture. Examples of machinery capable of generating the shear and mixing include extruders with kneaders or mixing elements with one or more mixing tips or flights, extruders with one or more screws, extruders of co- or counter-rotating type, a Coperion ZSK twin-screw extruder (available from Coperion Corporation), a Banbury mixer, a FCM™ Farrell Continuous Mixer (both available from Farrel Corporation, Ansonia Conn.), a BUSS Kneader™ (available from Buss, Inc. USA of Carol Stream, Ill.), and the like. The type and intensity of mixing, temperature, and residence time required can be achieved by the choice of one of the above machines in combination with the selection of kneading or mixing elements, screw design, and screw speed (<3000 rpm). Typically the temperature for melt-mixing is from about 60° C. to about 130° C., and the residence time is from about 10 to about 20 minutes.

Once melt-mixed or otherwise melt-blended, the masterbatch comprising the additive particles and propylene-α-olefin carrier resin may be pelletized by any suitable means, such as strand pelletization or the like. In some embodiments, underwater pelletization (e.g., extruding molten masterbatch into a water bath maintained at a temperature substantially lower than that of the molten extrudate, and pelletizing the masterbatch) may be particularly suited to pelletizing the masterbatch, owing at least in part to the propylene-α-olefin copolymer's nature. In certain embodiments, underwater pelletizing of the masterbatch may be carried out according to the techniques taught in U.S. Pat. No. 8,709,315, the entirety of which is incorporated by reference herein.

The masterbatch according to some embodiments is blended and formed such that the carbon black and/or other additive particles are well-dispersed within the propylene- or ethylene-based copolymer carrier resin, and are substantially non-agglomerated therein.

In particular embodiments wherein the additive comprises carbon black, agglomeration of carbon black particles in the carrier resin may be avoided by capping the amount of carbon black included in the carrier resin. Advantageously, use of the propylene-α-olefin copolymer as the carrier resin in accordance with certain embodiments may allow a larger amount of carbon black particles to be dispersed within the carrier resin, while still preventing agglomeration of those particles. This allows a greater amount of carbon black to be present in the TPV formulation, thereby reducing the cost of the formulation without adversely affecting the properties of the resulting TPV. For instance, with a greater carbon black loading in the masterbatch, less total masterbatch would be required to achieve the same ultimate concentration in the resulting TPV, which results in lower transportation cost and the like. However, even using a carrier resin according to embodiments of the present invention, carbon black particles will still agglomerate when present above a sufficiently high concentration, which agglomeration could lead to insufficient mixing and/or surface defects in the resulting TPV including the masterbatch. Thus in some embodiments, the masterbatch may comprise less than or equal to about 50 wt % carbon black particles; in other embodiments, the masterbatch may comprise less than or equal to any one of about 49, 48, 47, 46, 45, 44, and 43 wt % carbon black particles. In some embodiments, the masterbatch may comprise greater than or equal to any one of 35, 36, 37, 38, 39, 40, 41, 42, and 43 wt % carbon black particles. In certain embodiments, the masterbatch comprises about 45 wt % carbon black particles.

In some embodiments, the masterbatch further comprises one or more additional components (besides the one or more filler, pigmentation, extender, or other additives such as carbon black), such as any one or more of processing aids (e.g., slip agents), antioxidants, stabilizers, and the like. In certain embodiments, any additive suitable for inclusion in a TPV (particulate or not) may be incorporated into the masterbatch.

Additional TPV Additives

The thermoplastic vulcanizate formulations of some embodiments may optionally further comprise one or more additives in addition to the masterbatch. Suitable additional TPV additives include, but are not limited to, plasticizers, process oils, fillers, processing aids, acid scavengers, and/or the like.

Any suitable process oil may be included in the TPV formulation of some embodiments. In particular embodiments, process oils may be selected from: (i) extension oil, that is, oil present in an oil-extended rubber (such as oil present in the elastomer component); (ii) free oil, that is, oil that is added during the vulcanization process (separately from any other TPV formulation component such as the elastomer and thermoplastic vulcanizate); (iii) curative oil, that is, oil that is used to dissolve/disperse the curative, for example, a curative-in-oil dispersion such as a phenolic resin-in-oil (and in such embodiments, the curing composition may therefore be present in the TPV formulation as the curative-in-oil additive); and (iv) any combination of the foregoing oils from (i)-(iii). Thus, process oil is may be present in a TPV formulation as part of another component (e.g., as part of the elastomer component when the process oil is an extension oil, such that the elastomer component comprises elastomer and extension oil; or as part of the curing composition when the process oil is the carrier of a curative-in-oil, such that the curing composition comprises the curative oil and a curing agent). On the other hand, process oil may be added to the TPV separately from other components, i.e., as free oil.

The extension oil, free oil, and/or curative oil may be the same or different oils in various embodiments. Process oils may include one or more of (i) "refined" or "mineral" oils, and (ii) synthetic oils. As used herein, mineral oils refer to any hydrocarbon liquid of lubricating viscosity (i.e., a kinematic viscosity at 100° C. of 1 mm$^2$/sec or more) derived from petroleum crude oil and subjected to one or more refining and/or hydroprocessing steps (such as fractionation, hydrocracking, dewaxing, isomerization, and hydrofinishing) to purify and chemically modify the components to achieve a final set of properties. Such "refined" oils are in contrast to "synthetic" oils, which are manufactured by combining monomer units into larger molecules using catalysts, initiators, and/or heat.

In general, either refined or synthetic process oils according to some embodiments may include, but are not limited to, any one or more of aromatic, naphthenic, and paraffinic oils. Exemplary synthetic processing oils are polylinear alpha-olefins, polybranched alpha-olefins, and hydrogenated polyalphaolefins. The compositions of some embodiments of this invention may include organic esters, alkyl ethers, or combinations thereof. U.S. Pat. Nos. 5,290,886 and 5,397,832 are incorporated herein in this regard.

In certain embodiments, at least a portion of the process oil (e.g., all or a portion of any one or more of extension oil, free oil, and/or curative oil) is a low aromatic/sulfur content oil and has (i) an aromatic content of less than 5 wt %, or less than 3.5 wt %, or less than 1.5 wt %, based on the weight of that portion of the process oil; and (ii) a sulfur content of less than 0.3 wt %, or less than 0.003 wt %, based on the weight of that portion of the process oil. Aromatic content may be determined in a manner consistent with method ASTM D2007. The percentage of aromatic carbon in the process oil of some embodiments is preferably less than 2, 1, or 0.5%. In certain embodiments, there are no aromatic carbons in the process oil. The proportion of aromatic carbon (%) as used herein is the proportion (percentage) of the number of aromatic carbon atoms to the number of all carbon atoms determined by the method in accordance with ASTM D2140.

Suitable process oils of particular embodiments may include API Group I, II, III, IV, and V base oils. See API 1509, Engine Oil Licensing and Certification System, 17$^{th}$ Ed., September 2012, Appx. E, incorporated herein by reference. Particular examples of suitable process oils include Paralux™ and/or Paramount™ oils commercially available from Chevron Corp., Houston, Tex.

In general, suitable process oils may include any process oil described in U.S. Provisional Patent Application No. 61/992,020, entitled "Thermoplastic Vulcanizates and Method of Making the Same," filed May 12, 2014, the entirety of which is incorporated herein by reference. Further, process oils of some embodiments may be present in any proportion(s) described therein.

A TPV formulation of some embodiments may also or instead include a polymeric processing additive. The processing additive employed in such embodiments is a polymeric resin that has a very high melt flow index. These polymeric resins include both linear and branched molecules that have a melt flow rate that is greater than about 500 dg/min, more preferably greater than about 750 dg/min, even more preferably greater than about 1000 dg/min, still more preferably greater than about 1200 dg/min, and still more preferably greater than about 1500 dg/min. The thermoplastic elastomers of the present invention may include mixtures of various branched or various linear polymeric processing additives, as well as mixtures of both linear and branched polymeric processing additives. Reference to polymeric processing additives will include both linear and branched additives unless otherwise specified. The preferred linear polymeric processing additives are polypropylene homopolymers. The preferred branched polymeric processing additives include diene-modified polypropylene polymers. Thermoplastic vulcanizates that include similar processing additives are disclosed in U.S. Pat. No. 6,451,915, which is incorporated herein by reference.

In addition, the formulation may also or instead include reinforcing and non-reinforcing fillers, antioxidants, stabilizers, lubricants, antiblocking agents, anti-static agents, waxes, foaming agents, pigments, flame retardants and other processing aids known in the rubber compounding art. These additives can comprise up to about 50 weight percent of the total composition in certain embodiments. Fillers and extenders that can be utilized include conventional inorganics such as calcium carbonate, clays, silica, talc, titanium dioxide, as well as organic and inorganic nanoscopic fillers. Fillers are preferably added in masterbatch form, in combination with a carrier resin such as polypropylene.

In certain embodiments, additional TPV additives may be added in their own separate additional masterbatch(es) (e.g., with one or more additional TPV additives per such additional masterbatch). In such embodiments, each additional masterbatch may comprise a carrier resin according to the carrier resin of any of the masterbatches of various embodiments discussed above, and/or it may comprise a conventional carrier resin.

In certain embodiments, the TPV formulation may include acid scavengers. These acid scavengers are preferably added to the thermoplastic vulcanizates after the desired level of cure has been achieved (discussed in greater detail below with respect to processing TPV formulations). Preferably, the acid scavengers are added after dynamic vulcanization. Useful acid scavengers include hydrotalcites. Both synthetic and natural hydrotalcites can be used. An exemplary natural hydrotalcite can be represented by the formula $Mg_6Al_2(OH)_{1-6}CO_3.4H_2O$. Synthetic hydrotalcite compounds, which are believed to have the formula: $Mg_{4.3}Al_2(OH)_{1.26}CO_3.mH_2O$ or $Mg_{4.5}Al_2(OH)_{13}CO_{3.3}.5H_2O$, can be obtained under the tradenames DHT-4A™ or Kyowaad™ 1000 (Kyowa; Japan). Another commercial example is that available under the trade name Alcamizer™ (Kyowa).

Compositions of TPV Formulations

In general, a TPV formulation according to various embodiments includes the elastomer component, thermoplastic resin, curing agent, and masterbatch (e.g., carbon black masterbatch), along with any other optional additives. As will be discussed in more detail below, the TPV formulation undergoes processing, including dynamic vulcanization, to form a TPV. In certain embodiments, the masterbatch and/or any other additives may be added to the TPV formulation during processing, either before or after dynamic vulcanization.

Relative amounts of the various components in TPV formulations are conveniently characterized based upon the amount of elastomer in the formulation, in particular in parts by weight per hundred parts by weight of rubber (phr). In embodiments wherein the elastomer component comprises both elastomer and extension oil, as is common for much commercially available elastomers such as EPDM, the phr amounts are based only upon the amount of elastomer in the elastomer component, exclusive of extension oil present in the elastomer component. Thus, an elastomer component containing 100 parts EPDM (rubber) and 75 parts extension oil would in fact be considered present in a TPV formulation at 175 phr (i.e., on the basis of the 100 parts EPDM rubber). If such a TPV formulation were further characterized as containing 50 phr thermoplastic resin, the formulation would include 50 parts by weight of thermoplastic resin in addition to the 100 parts by weight elastomer and 75 parts by weight extension oil.

TPV formulations of some embodiments may include the thermoplastic resin in an amount from about 20 to about 300 parts per hundred parts by weight of the elastomer or rubber (phr). In various embodiments, the thermoplastic resin is included in a TPV formulation in an amount ranging from a low of any one of about 30, 35, 40, 45, 50, 55, 60, 65, 70, 75, 80, 85, 90, 95, 100, 105, 110, 115, 120, 125, 130, 135, 140, 145, 150, 165, 170, and 175 phr, to a high of any one of about 100, 125, 150, 175, 200, 225, 250, 275, and 300 phr. The thermoplastic resin may be included in an amount ranging from any of the aforementioned lows to any of the aforementioned highs, provided that the high value is greater than or equal to the low value. In particular embodiments, increasing amounts of thermoplastic resin correspond to increasing hardness of the dynamically vulcanized TPV.

When the elastomeric component consists of elastomer only, it is by definition present at 100 phr (since it is the basis of the phr notation). However, in embodiments wherein the elastomeric component comprises a constituent other than an elastomer, such as an extender oil, the elastomeric component may be included in a TPV formulation in an amount ranging from a low of any one of about 100.05, 100.1, 100.15, 100.2, 105, 110, 115, and 120 phr to a high of any one of about 110, 120, 125, 150, 175, 200, 225, and 250 phr.

TPV formulations of various embodiments further comprise masterbatch (comprising an additive (e.g., carbon black) and carrier resin comprising propylene- or ethylene-based copolymer) in an amount ranging from a low of any one of about 3, 4, 5, 6, 7, 8, 9, 10, 11, 12, 13, 14, 15, 16, 17, 18, 19, 20, 21, 22, 23, 24, and 25 phr, to a high of any one of about 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50 phr. The masterbatch may be included in an amount ranging from any one of the aforementioned lows to any one of the aforementioned highs, provided that the high value is greater than or equal to the low value. In certain embodiments in which multiple additives (particulate and/or otherwise) are included in the masterbatch, the masterbatch may be present in the TPV formulation in higher amounts, such as up to any one of about 55, 60, 65, 70, 75, 80, 85, 90, 95, 100, 150, 200, 250, 300, and 350 phr.

The TPV formulations also include one or more curing compositions (the curing composition, as discussed above, comprising curing agent and optionally one or more co-agents and/or curative oils). In some embodiments, the one or more curing compositions are present in a TPV formulation in an aggregate amount ranging from a low of any one of about 2, 2.5, 3, 3.5, 4, 4.5, 5, 6, 7, 8, 9, and 10 phr to a high of any one of about 3, 4, 5, 6, 7, 8, 9, 10, 11, 12, 13, 14, 15, 16, 17, 18, 19, 20, 21, 22, 23, 24, and 25 phr. The one or more curing agents may be included in an amount ranging from any one of the aforementioned lows to any one of the aforementioned highs, provided that the high value is greater than or equal to the low value.

As previously noted, TPV formulations of certain embodiments may optionally include additional TPV additives, i.e., additives other than to the one or more additives delivered in the masterbatch, and also other than any additives included in another component of the TPV formulation (such as the elastomer component). Amounts of additional additive are separate and in addition to those additives already included in another component of a TPV formulation. For instance, any additive such as extension oil included in the elastomeric component has already been accounted for as part of the amount of elastomeric component added to the formulation; recited amounts of additional additives therefore are exclusive of additives already included in the elastomeric component. Similarly, any additive included in the masterbatch has also already been accounted for; accordingly, reference herein to amounts of additional additive(s) do not include such additives already included in the masterbatch. Subject to the foregoing caveats, additional additives may be present in a TPV formulation in the aggregate in an amount ranging from about 0 phr to about 300 phr. In certain embodiments, additional additives may in the aggregate be present in the TPV in an amount ranging from a low of any one of about 0, 10, 20, 30, 40, 50, 60, 70, 80, 90, and 100 phr, to a high of any one of about 100, 125, 150, 175, 200, 225, 250, 275, and 300 phr. The additional additives may be included in an aggregate amount ranging from any one of the aforementioned lows to any one of the aforementioned highs, provided that the high value is greater than or equal to the low value.

For convenience, components of TPV formulations of various embodiments may alternatively be characterized based upon their weight percentages in the TPV formulation according to the following:

The thermoplastic resin(s) may be present in a TPV formulation in amounts ranging from a low of any one of about 5, 6, 7, 8, 9, 10, 11, 12, 13, 14, 15, 16, 17, 18, 19, 20, 21, 22, 23, 24, and 25 wt % to a high of any one of about 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, and 55 wt %, provided that the high is greater than or equal to the low.

The elastomeric component(s) may be present in a TPV formulation in amounts ranging from a low of any one of about 3, 4, 5, 6, 7, 8, 9, 10, 11, 12, 13, 14, 15, 16, 17, 18, 19, 20, 25, 30, and 35 wt % to a high of any one of about 35, 40, 45, 50, 55, 60, 65, 70, 75, and 80 wt %, provided that the high is greater than or equal to the low, and that the elastomeric component(s) are present in the TPV formulation within the range of about 20 to about 300 phr.

The curative(s) may be present in a TPV formulation in amounts ranging from a low of any one of about 0.4, 0.5, 0.6, 0.7, 0.8, 0.9, and 1.0 wt % to a high of any one of about 1.0, 1.5, 2, 3, 4, 5, 6, 7, 8, 9, 10, 11, 12, and 13 wt %, provided that the high is greater than or equal to the low, and that the curative(s) are present in the TPV formulation with the range of about 0.5 to about 25 phr.

The masterbatch may be present in a TPV formulation in amounts ranging from a low of any one of about 0.1, 0.5, 1, 2, 3, 4, 5, 6, 7, 8, 9, and 10 wt % to a high of any one of about 5, 6, 7, 8, 9, 10, 11, 12, 13, 14, 15, 16, 17, 18, 19, 20, 21, 22, 23, 24, 25, 26, 27, and 27.5 wt %, provided that the high is greater than or equal to the low, and that the carbon black masterbatch is present in the TPV formulation within the range of about 10 to about 50 phr. Where multiple additives are present in the masterbatch in accordance with the previous discussion, the masterbatch may be present in amounts up to any one of about 30, 35, 40, 45, 50, 55, and 60 wt %, provided the carbon black masterbatch is present in the TPV formulation within the range of about 10 to about 350 phr.

The optional additional TPV additive(s) may be present in a TPV formulation in aggregate amounts ranging from a low of any one of about 0, 5, 10, 15, 20, 25, 30, 35, and 40 wt % to a high of any one of about 30, 35, 40, 45, 50, 55, 60, and 65 wt %, provided that the high is greater than or equal to the low, and that the additive(s) are present in the TPV formulation within the range of about 0 to about 300 phr.

Finally, it should also be noted that, in certain embodiments, the amount of propylene-α-olefin copolymer present in the TPV formulation (added through the carbon black masterbatch, other additive masterbatch(es), and/or through any other means) is in aggregate less than or equal to any one of about 6, 5, 4, 3, or 2 wt %, by total weight of the TPV formulation. In certain preferred embodiments, the propylene-α-olefin copolymer may be present in the TPV formulation and/or the resulting TPV in an amount less than about 4 wt %, and in other embodiments less than or equal to about 3 wt %.

Processing TPV Formulations

The thermoplastic vulcanizates are preferably prepared by processing of the TPV formulation, which processing according to some embodiments includes dynamic vulcanization. Dynamic vulcanization refers to a vulcanization (i.e., cross-linking or curing) process for an elastomer contained in a blend that includes the elastomer, curatives, and at least one thermoplastic resin. The elastomer is vulcanized under conditions of shear and extension at a temperature at or above the melting point of the thermoplastic resin. The elastomer is thus simultaneously crosslinked and dispersed (preferably as fine particles) within the thermoplastic resin matrix, although other morphologies, such as co-continuous morphologies, may exist depending on the degree of cure, the elastomer to plastic viscosity ratio, the intensity of mixing, the residence time, and the temperature.

In some embodiments, processing may include melt blending, in a chamber, a TPV formulation comprising the elastomer component, thermoplastic resin, and curing agent. The chamber may be any vessel that is suitable for blending the selected composition under temperature and shearing force conditions necessary to form a thermoplastic vulcanizate. In this respect, the chamber may be a mixer, such as a Banbury™ mixer, or a mill, or an extruder. According to one embodiment, the chamber is an extruder, which may be a single or multi-screw extruder. The term "multi-screw extruder" means an extruder having two or more screws; with two and three screw extruders being exemplary, and two or twin screw extruders being preferred in some embodiments. The screws of the extruder may have a plurality of lobes; two and three lobe screws being preferred. It will readily be understood that other screw designs may be selected in accordance with the methods of embodiments of the present invention. In some embodiments, dynamic vulcanization may occur during and/or as a result of extrusion.

The dynamic vulcanization of the elastomer may be carried out so as to achieve relatively high shear as defined in U.S. Pat. No. 4,594,390, which is incorporated herein by reference. In some embodiments, the mixing intensity and residence time experienced by the ingredients during dynamic vulcanization is preferably greater than that proposed in U.S. Pat. No. 4,594,390. In particular embodiments, the blending may be performed at a temperature not exceeding about 400° C., preferably not exceeding about 300° C., and more preferably not exceeding about 250° C. The minimum temperature at which the melt blending is performed is generally higher than or equal to about 130° C., preferably higher than or equal to about 150° C. and more particularly higher than about 180° C. The blending time is chosen by taking into account the nature of the compounds used in the TPV formulation and the blending temperature. The time generally varies from about 5 seconds to about 120 minutes, and in most cases from about 10 seconds to about 30 minutes.

Dynamic vulcanization in some embodiments may include phase inversion. As those skilled in the art appreciate, dynamic vulcanization may begin by including a greater volume fraction of rubber than thermoplastic resin. As such, the thermoplastic resin may be present as the discontinuous phase when the rubber volume fraction is greater than that of the volume fraction of the thermoplastic resin. As dynamic vulcanization proceeds, the viscosity of the rubber increases and phase inversion occurs under dynamic mixing. In other words, upon phase inversion, the thermoplastic resin phase becomes the continuous phase.

Carbon black masterbatch and any other additive(s) are preferably present within the TPV formulation when dynamic vulcanization is carried out, although in some embodiments, masterbatch and/or any one or more other additives (if any) may be added to the composition after the curing and/or phase inversion (e.g., after the dynamic vulcanization portion of processing). Masterbatch and/or other additional ingredients may be included after dynamic vulcanization by employing a variety of techniques. In one embodiment, the masterbatch and/or other additional ingredients can be added while the thermoplastic vulcanizate remains in its molten state from the dynamic vulcanization process. For example, the additional ingredients can be added downstream of the location of dynamic vulcanization within a process that employs continuous processing equipment, such as a single or twin screw extruder. In other embodiments, the thermoplastic vulcanizate can be "worked-up" or pelletized, subsequently melted, and the additional ingredients can be added to the molten thermoplastic vulcanizate product. This latter process may be referred to as a "second pass" addition of the ingredients.

In certain embodiments, the TPV in molten form may be passed through a screen pack comprising one or more mesh screens at any point after dynamic vulcanization. The screen pack in certain embodiments comprises a 200 Standard U.S. Mesh screen (i.e., a mesh screen having 200 openings as measured across one linear inch of the mesh), or a finer screen (i.e., a screen having a larger number of openings in one inch than a 200 mesh screen, such as a 230, 270, 325, or 400 U.S. Mesh screen). In other embodiments, the screen pack may comprise a 120, 140, 170, or finer U.S. Mesh screen. The screen pack of certain embodiments comprises multiple screens. For instance, the screen pack may comprise three screens in series: an inner mesh screen that is the most refined screen sandwiched between two supporting screens (e.g., via edge welding or other conventional means of forming a screen pack). For example, the screen pack may be a 20/200/20 pack (referencing a 200 U.S. Mesh screen sandwiched between two 20 U.S. Mesh screens). In other embodiments, the screen pack may include 5, or more than 5, screens in series, such as a 10/20/200/20/10 screen arrangement (with the numbers again referencing U.S. Mesh sizes). In general, the center-most screen may be the most refined screen in the screen pack, surrounded by 2 or more supporting screens in series. The supporting screens may be any suitable mesh size that is less refined than the center screen (e.g., any one of 20, 25, 30, 35, 40, 45, 50, 60, 70, 80, 100, etc. U.S. Mesh). Mesh sizes in a screen may equivalently be represented in microns, where the number of microns indicates the width or length of an approximately square opening in the screen. Thus, a 200 U.S. Mesh screen (having 200 openings as measured across one linear inch of the mesh) is equivalent to a 74 micron screen (meaning each approximately square opening has length and width of 74 microns).

In some such embodiments, the TPV may be passed through the screen pack directly after dynamic vulcanization, or in other embodiments, it may be passed through the screen pack at any other point in which the composition is in a molten state (e.g., during a second pass addition of other ingredients). Advantageously, passing the TPV through such a screen pack according to some embodiments may enhance surface smoothness of the resulting TPV after extrusion or other processing.

Despite the fact that the elastomer may be partially or fully cured, the compositions of this invention can be processed and reprocessed by conventional plastic processing techniques such as extrusion, injection molding, and compression molding. The rubber within these thermoplastic elastomers is usually in the form of finely-divided and well-dispersed particles of vulcanized or cured rubber within a continuous thermoplastic phase or matrix, although a co-continuous morphology or a phase inversion is also possible.

Inclusion of the propylene- or ethylene-based copolymer as a masterbatch carrier resin increases the TPV formulation's processability (and/or the TPV's processability) in some embodiments. For instance, TPVs formulations formed according to some embodiments exhibit increased extrusion throughput, in particular as compared to TPV formulations formed from masterbatches using conventional carrier resins such as homopolypropylene. This extrusion throughput increase may be realized in either or both of: original processing of the TPV formulation to form the TPV, and/or in processing of the formed TPV (e.g., reprocessing of TPV pellets or the like for end-use product formation, discussed in more detail below). Extrusion throughput of TPV formulations comprising propylene- or ethylene-based copolymer carrier resins according to some embodiments may be about 2% to about 15% greater than extrusion throughput rates for corresponding TPV formulations instead comprising homopolypropylene or other conventional carrier resins. In certain embodiments, the improvement may be about 5% to about 7%.

Resulting Thermoplastic Vulcanizate

The resulting TPV in some embodiments may accordingly be characterized as comprising the compounded reaction product of the ingredients forming the TPV formulation following processing of those ingredients, wherein the processing includes dynamic vulcanization.

In preferred embodiments, the TPV comprises the cured elastomer in the form of finely-divided and well-dispersed particles within the thermoplastic medium. Put another way, the TPV comprises a disperse phase (comprising the at least partially cured elastomer component) in a continuous phase (comprising the thermoplastic resin). In various of these embodiments, the elastomer particles have an average diameter that is less than 50 micrometers, preferably less than 30 micrometers, even more preferably less than 10 micrometers, still more preferably less than 5 micrometers and even more preferably less than 1 micrometer. In preferred embodiments, at least 50%, more preferably at least 60%, and even more preferably at least 75% of the particles have an average diameter of less than 5 micrometers, more preferably less than 2 micrometers, and even more preferably less than 1 micrometer.

In one embodiment, the elastomer in the resulting TPV is advantageously completely or fully cured. The degree of cure can be measured by determining the amount of rubber that is extractable from the thermoplastic vulcanizate by using boiling xylene as an extractant. This method is disclosed in U.S. Pat. No. 4,311,628, which is incorporated herein by reference. Preferably, the rubber has a degree of cure where not more than 15 weight percent, preferably not more than 10 weight percent, more preferably not more than 5 weight percent, and still more preferably not more than 3 weight percent is extractable by boiling xylene as described in U.S. Pat. Nos. 5,100,947 and 5,157,081, which are incorporated herein by reference. Alternatively, the rubber has a degree of cure such that the crosslink density is preferably at least $4 \times 10^{-5}$, more preferably at least $7 \times 10^{-5}$, and still more preferably at least $10 \times 10^{-5}$ moles per milliliter of elastomer. See also "Crosslink Densities and Phase Morphologies in Dynamically Vulcanized TPEs," by Ellul et al., 68 RUBBER CHEMISTRY AND TECHNOLOGY pp. 573-584 (1995), incorporated herein by reference.

Incorporation of the propylene-α-olefin copolymer as a carrier resin of the masterbatch surprisingly results in improved properties of the TPV, such as surface smoothness. As will be discussed in greater detail in connection with the Examples below, this is unexpected as compared to TPVs formed from inclusion of even the same propylene-α-olefin copolymer via direct blending of the propylene-α-olefin into a TPV formulation (as opposed to inclusion of the propylene-α-olefin copolymer as the carrier resin of the included carbon black masterbatch). This is because it has been found generally that increasing amounts propylene-α-olefin copolymer included in a TPV formulation result in increased throughput of the TPV during processing steps such as extrusion, but at the tradeoff of negatively impacting the elastic properties of the resultant TPV. In particular, the minimum amount of propylene-α-olefin copolymer directly blended into a TPV formulation that is necessary for improved extrusion throughput rates is at least 6 wt %, by weight of the final TPV. However, including propylene-α-olefin copolymer in the TPV beyond 4 wt % adversely affects the TPV's elastic properties, such as the TPV's compression set (i.e., the TPV's permanent deformation resulting from application of a force to the TPV, after removal of the force).

Surprisingly, using the propylene-α-olefin copolymer as a carrier resin in the carbon black masterbatch, and adding such a carbon black masterbatch to the TPV, allows the throughput benefits to be realized at less than 4 wt %, such as at only about 3 wt %, total propylene-α-olefin copolymer in the TPV (as shown in Samples E1 and E2 of Example 2 below). This is advantageously below the cut-off of 4 wt % propylene-α-olefin copolymer, above which elastomeric properties of the TPV decline.

As with TPV formulations, the extrusion throughput rate of the resulting TPV (e.g., when TPV pellets or the like are reprocessed for end-use product formation) is also enhanced in some embodiments, as compared to extrusion throughput of TPVs formed with conventional carrier resins such as homopolypropylene. Extrusion throughput of TPVs comprising propylene- or ethylene-based copolymer carrier resins according to some embodiments may be about 2% to about 15% greater than extrusion throughput rates for corresponding TPVs instead incorporating masterbatch(es) of homopolypropylene and/or other conventional carrier resins. In certain embodiments, the improvement may be about 5% to about 7%.

Further, propylene-α-olefin copolymer included in such a manner additionally enhances surface appearance of the final TPV. The improved surface appearance is observed as either decreased extrusion surface roughness (ESR), surface spot count, or both. Extrusion surface roughness is a measure of surface texture as described in Chemical Surface Treatments of Natural Rubber And EPDM Thermoplastic Elastomers: Effects on Friction and Adhesion, Rubber Chemistry and Technology, Vol. 67, No. 4 (1994), which is incorporated herein by reference. Surface spot count is a visual measure of the number of surface spots on an extruded thermoplastic vulcanizate sample. As reported herein, surface spot counts and ESR values are based upon a 1 in.×18 in. extruded TPV strip. Surface spot counts are performed by visual inspection, and involve counting the number of blemishes (e.g., topographical unevenness, discoloration, or other irregularity visible to the naked human eye, as opposed to visible through microscopy). ESR is measured in microns according to $R_a$, the arithmetic average of the roughness profile.

A TPV of certain embodiments (and/or a TPV formed by certain embodiments) may have a surface spot count less than or equal to any one of 9, 8, 7, 6, 5, 4, 3, 2, or 1.

EXAMPLES

Example 1

Four carbon black masterbatches were prepared with different carrier resins to make TPVs as shown in Table 1. First, three carbon black masterbatch samples (#1-3) were made of commercially available isotactic polypropylene carrier resins of different MFR (as reported in Table 1), and the fourth masterbatch sample was made with a carrier resin of a propylene-α-olefin copolymer in accordance with the propylene-α-olefin copolymers of embodiments discussed above (in this case, Vistamaxx™ polymer, grade 6202, available from ExxonMobil Chemical Company, Baytown, Tex.). The Vistamaxx™ polymer, grade 6202, had a density of 0.863 g/cm³ as determined in accordance with ASTM D1505; melt index of 9.1 g/10 min as determined according to ASTM D1238 (at 190° C., 2.16 kg); a melt flow rate (MFR) of 20 g/10 min; and ethylene-derived unit content of 15 wt % (the balance being propylene-derived units). The isotactic polypropylene homopolymers (of samples #1-3) had typical isotactic polypropylene densities of 0.945 g/cm³.

The concentration of carbon black in the masterbatch was kept at 40 wt % for the polypropylene resins due to agglomeration taking place in higher carbon black concentrations; however, the carbon black in sample #4 (using the Vistamaxx™ 6202 as carrier resin) was present at 45 wt %.

TABLE 1

Carbon Black Masterbatch Samples

| | Masterbatch (MB) Sample | | | |
| --- | --- | --- | --- | --- |
| | #1 | #2 | #3 | #4 |
| Carbon Black in MB (wt %) | 40 | 40 | 40 | 45 |

TABLE 1-continued

Carbon Black Masterbatch Samples

| | Masterbatch (MB) Sample | | | |
|---|---|---|---|---|
| | #1 | #2 | #3 | #4 |
| 35 MFR PP in MB (wt %) | 60 | — | — | — |
| 12 MFR PP in MB (wt %) | — | 60 | — | — |
| 10 MFR PP in MB (wt %) | — | — | 60 | — |
| VM6202 (wt %) | — | — | — | 55 |

Example 2

Each of the carbon black masterbatches from Example 1 was used to make two TPV formulations, for a total of 8 sample formulations. Each TPV formulation was formed into pellets using a Coperion ZSK53 twin-screw extruder operated at about 300 RPM. Production rate was about 90 kg/hr. At the end of the twin-screw extruder, prior to formation of the final pellet, the material was passed through a screen pack comprising either a 100 U.S. Mesh or 200 U.S. Mesh screen (20/100/20 and 20/200/20 screen packs, respectively). Thus, four of the samples (C1, C3, C5, and E1) were made using 100 U.S. Mesh, and four (C2, C4, C6, and E2) with 200 U.S. Mesh. The eight TPV formulations, and properties of each of the eight resulting TPVs, are given below in Table 2 as samples C1-C6 and E1-E2, with each of E1 and E2 indicating the inventive TPV formulations including the Masterbatch Sample #4 from Example 1 (i.e., the masterbatch including propylene-α-olefin carrier resin). In addition, Table 2 also includes sample C8, which was prepared by directly adding propylene-α-olefin copolymer (Vistamaxx™ 3000) to the TPV formulation. Sample C7 is a second sample prepared using Carbon Black MB #1 from Example 1 above, given as further comparison against C8.

The extrusion throughput rates of Table 2 are reported for a single-screw extruder, indicating the throughput rate of the TPV pellets when the TPV pellets are processed in a single-screw extruder (e.g., for end-use TPV product formation).

As shown in Table 2, each sample TPV formulation further included various other ingredients. "EPDM" was Vistalon™ 3666 EPDM rubber which is an ethylene-propylene-diene rubber that has 64.0 wt % ethylene content (ASTM D3900) and 4.5 wt % ENB diene content (ASTM D6047). V3666 is oil extended with 75 phr of oil and has a Mooney Viscosity of 52 MU (ML 1+4, 125° C.; ASTM D1646). V3666 is commercially available from ExxonMobil Chemical Company.

"Clay" was Icecap™ K Clay.

"Zinc Oxide" or "ZnO" was Kadox 911 zinc oxide.

"FRPP" was low melt or fractional melt polypropylene homopolymer PP5341, commercially available from ExxonMobil Chemical Company. HFPP was high flow polypropylene homopolymer F180A, commercially available from Braskem America, Inc. The FRPP and HFPP together constitute the thermoplastic resin of the TPV formulation.

"$SnCl_2$" was an anhydrous stannous chloride polypropylene masterbatch. The stannous chloride masterbatch contained 45 wt % stannous chloride and 55 wt % of polypropylene having an MFR of 0.8 g/10 min.

"RIO" was a phenolic resin-in-oil curative that contained 30 wt % phenolic resin and 70 wt % process oil.

"Oil #1" and "Oil #2" were each Paralux™ 6001R oil, which is commercially available from Chevron Corporation. Oil #1 and Oil #2 were respectively added to the formulation at different points along the Coperion extruder before and after dynamic vulcanization.

"VM3000" was Vistamaxx™ polymer, grade 3000, commercially available from ExxonMobil Chemical Company. VM3000 had density of 0.873 g/cm³ (measured according to ASTM D1505), MI 3.6 g/10 min (ASTM D1238, at 190° C., 2.16 kg), MFR of 8 g/10 min, 11 wt % ethylene-derived units and the balance propylene-derived units.

Carbon Black MB #1-#4 each respectively indicate one of the Carbon Black Masterbatches prepared as set forth in Example 1.

TABLE 2

Sample TPV Properties

| | C1 | C3 | C5 | E1 | C2 | C4 | C6 | E2 | C7 | C8 |
|---|---|---|---|---|---|---|---|---|---|---|
| EPDM (phr) | 175 | 175 | 175 | 175 | 175 | 175 | 175 | 175 | 175 | 175 |
| Clay (phr) | 42 | 42 | 42 | 42 | 42 | 42 | 42 | 42 | 42 | 42 |
| ZnO (phr) | 1.5 | 1.5 | 1.5 | 1.5 | 1.5 | 1.5 | 1.5 | 1.5 | 2 | 2 |
| FRPP (phr) | 28.92 | 28.92 | 28.92 | 29.99 | 28.92 | 28.92 | 28.92 | 29.99 | 38.34 | 38.34 |
| HFPP (phr) | 10.8 | 10.8 | 10.8 | 12.4 | 10.8 | 10.8 | 10.8 | 12.4 | 0 | 0 |
| $SnCl_2$ (phr) | 1.67 | 1.67 | 1.67 | 1.67 | 1.67 | 1.67 | 1.67 | 1.67 | 1.67 | 1.67 |
| Oil#1 (phr) | 5.82 | 5.82 | 5.82 | 5.82 | 5.82 | 5.82 | 5.82 | 5.82 | 10.82 | 10.82 |
| RIO (phr) | 9.5 | 9.5 | 9.5 | 9.5 | 9.5 | 9.5 | 9.5 | 9.5 | 10.29 | 10.29 |
| Oil#2 (phr) | 52.33 | 52.33 | 52.33 | 52.33 | 52.33 | 52.33 | 52.33 | 52.33 | 43.3 | |
| VM3000 (phr) | | | | | | | | | | 14.49 |
| Carbon Black MB #1 | 24 | | | | 24 | | | | 24.25 | 24.25 |
| Carbon Black MB #2 | | 24 | | | | 24 | | | | |
| Carbon Black MB #3 | | | 24 | | | | 24 | | | |
| Carbon Black MB #4 | | | | 21.3 | | | | 21.3 | | |
| Melt Screen Mesh Size | 100 | 100 | 100 | 100 | 200 | 200 | 200 | 200 | 100 | 100 |
| Single Screw Extruder Rate (Kg/hr) | 68.04 | 67.08 | 66.96 | 78.6 | 69.48 | 68.88 | 63.6 | 78.72 | 72.4 | 74.4 |
| Extrudate Surface Spot Counts | 10.00 | 15.00 | 10 | 8.00 | 9.00 | 3.00 | 6 | 2.00 | — | — |
| Other Properties | | | | | | | | | | |
| Specific Gravity (ISO 1183-1, Method A) | 0.9625 | 0.9711 | 0.9777 | 0.9584 | 0.9674 | 0.97 | 0.9708 | 0.9746 | | |

TABLE 2-continued

Sample TPV Properties

| | C1 | C3 | C5 | E1 | C2 | C4 | C6 | E2 | C7 | C8 |
|---|---|---|---|---|---|---|---|---|---|---|
| Hardness, Shore A (ISO 868 Plied-15 sec. Delay) | 69.4 | 73.6 | 74.4 | 69.1 | 73.2 | 73.2 | 73.6 | 72.2 | 72.4 | 73 |
| LCR Viscosity* Pa · S | | 78.7 | 80.1 | 88.8 | | 76.8 | | 93.2 | 78.2 | 78.5 |
| Tension Set (%) | 1.5 | 1 | 2 | 2 | 2 | 1 | 1.5 | 1.5 | | |
| UTS, Mpa (ISO37, Type 1, 500 mm/min Perpendicular to flow) | 6 | 6.9 | 6.6 | 6.1 | 6.6 | 6.7 | 6.5 | 6.2 | 7.23 | 7.49 |
| M100, Mpa (ISO37, Type 1, 500 mm/min Perpendicular to flow) | 2.94 | 3.22 | 3.25 | 2.75 | 3.09 | 3.21 | 3.14 | 3.07 | 3.29 | 3.28 |
| UE, % (ISO37, Type 1, 500 mm/min Perpendicular to flow) | 430 | 440 | 440 | 420 | 450 | 420 | 440 | 410 | 420 | 464 |
| ESR, Ra (micron) | 39.5 | 52.4 | 39.8 | 61.1 | 37.8 | 42.8 | 47.8 | 44.8 | 44 | 33 |

*LCR capillary viscosity was determined with a Dynisco™ capillary rheometer at 30:1 L/D at 1200 1/s.

As shown in Table 2, the pelletized samples E1 and E2 in accordance with embodiments of the present invention exhibited superior extrusion throughput rates (78.6 and 78.72 kg/hr single screw extruder rates, respectively) as compared to all other samples (including those prepared with Vistamaxx™ added directly to the TPV formulation). In addition, the surface spot counts of each of E1 and E2 were lower (i.e., the surface smoothness was higher) than the comparative TPV formulations made using masterbatches with polypropylene carrier resins (when comparing to other samples made using the same screen size). Finally, as is also apparent, the 200 mesh screen resulted in lower surface spot counts across all samples as compared to the same TPV formulation passed through a 100-mesh screen.

The FIGURE further demonstrates the throughput rate improvement achieved through use of the propylene-α-olefin copolymer carbon black masterbatch carrier resin. As shown in the FIGURE, Sample E1 significantly outperformed sample C1 and C7 (both made using conventional carbon black masterbatches), and furthermore outperformed sample C8 (made using conventional carbon black masterbatch, and further with direct addition of Vistamaxx™ 3000 to the TPV formulation).

EMBODIMENTS

Embodiment 1

A method comprising: introducing to a chamber each of a thermoplastic resin, an elastomer component, a curing agent, and a carbon black masterbatch; and dynamically vulcanizing at least a portion of the elastomer component so as to form a thermoplastic vulcanizate wherein the elastomer component is at least partially vulcanized and is dispersed in a continuous phase comprising the thermoplastic resin; wherein the carbon black masterbatch comprises carbon black particles dispersed in a carrier resin comprising a propylene- or ethylene-based copolymer having (i) a density between about 0.850 and about 0.920 g/cm$^3$ and (ii) a melt index between about 0.05 and about 50 g/10 min as determined in accordance with ASTM D1238, at 190° C. and 2.16 kg weight.

Embodiment 2

The method of Embodiment 1, further comprising: passing the thermoplastic vulcanizate through a 200 U.S. Mesh or finer screen, after said dynamic vulcanization of the at least a portion of the elastomer component.

Embodiment 3

The method of any one of the foregoing embodiments, further comprising melt-mixing the propylene- or ethylene-based copolymer and the carbon black particles, and forming a plurality of masterbatch pellets comprising the carbon black particles dispersed in the propylene- or ethylene-based copolymer carrier resin, such that the masterbatch pellets are used as the carbon black masterbatch thereafter introduced to the chamber.

Embodiment 4

The method of Embodiment 3 wherein forming the plurality of masterbatch pellets comprises underwater pelletizing the melt-mixed propylene- or ethylene-based copolymer and carbon black particles.

Embodiment 5

The method of any one of the foregoing Embodiments, wherein the chamber is selected from the group consisting of a mixer, a mill, and an extruder.

Embodiment 6

The method of any one of the foregoing Embodiments, wherein the dynamic vulcanization is carried out at least in part by melt mixing the thermoplastic resin, the elastomer component, the curing agent, and the carbon black masterbatch.

Embodiment 7

The method of any one of the foregoing Embodiments, wherein the propylene- or ethylene-based copolymer is selected from the group consisting of propylene-α-olefin copolymers; ethylene-α-olefin copolymers; EP rubbers; and any combination thereof.

Embodiment 8

The method of Embodiment 7, wherein the propylene- or ethylene-based copolymer is a propylene-α-olefin copolymer comprising about 50 wt % to about 99 wt % propylene-derived units and about 1 wt % to about 35 wt % comonomer units derived from one of ethylene and a $C_4$-$C_{10}$ alpha-olefin, and having a heat of fusion of about 75 J/g or less.

Embodiment 9

The method of Embodiment 8, wherein the thermoplastic vulcanizate comprises less than or equal to 4 wt % of the propylene-α-olefin copolymer, by weight of the thermoplastic vulcanizate.

Embodiment 10

The method of Embodiment 7, wherein the propylene- or ethylene-based copolymer is an ethylene-α-olefin copolymer comprising about 60 wt % to about 99 wt % ethylene-derived units and about 1 wt % to about 40 wt % comonomer derived units derived from one of butane and octene.

Embodiment 11

The method of Embodiment 7, wherein the propylene- or ethylene-based copolymer is an EP rubber comprising between about 45 wt % and about 85 wt % ethylene-derived units and between about 0.5 wt % and about 10.0 wt % diene-derived comonomers.

Embodiment 12

The method of any one of the foregoing Embodiments, wherein the elastomer component comprises an ethylene-propylene-diene elastomer (EPDM).

Embodiment 13

The method of any one of the foregoing Embodiments, further comprising introducing to the chamber one or more additives selected from the group consisting of plasticizers, process oils, fillers, processing aids, acid scavengers, and any combination thereof.

Embodiment 14

A method for preparing a thermoplastic vulcanizate, the method comprising: (i) dynamically vulcanizing at least a portion of an elastomer component in the presence of a thermoplastic resin and a curing agent so as to form a thermoplastic vulcanizate wherein the elastomer component is at least partially vulcanized and is dispersed in a continuous phase comprising the thermoplastic resin; and (ii) introducing a carbon black masterbatch into the thermoplastic vulcanizate, wherein the carbon black masterbatch comprises carbon black particulates dispersed in a carrier resin comprising a propylene-α-olefin copolymer, the propylene-α-olefin copolymer comprising about 50 wt % to about 99 wt % propylene-derived units and about 1 wt % to about 35 wt % comonomer units derived from one of ethylene and a $C_4$-$C_{10}$ alpha-olefin, and having a heat of fusion of about 75 J/g or less.

Embodiment 15

The method of Embodiment 14, wherein introducing the carbon black masterbatch into the thermoplastic vulcanizate comprises blending the carbon black masterbatch with the thermoplastic vulcanizate while the thermoplastic vulcanizate remains in a molten state following the dynamic vulcanization.

Embodiment 16

The method of Embodiment 14, further comprising pelletizing the thermoplastic vulcanizate so as to form a plurality of thermoplastic vulcanizate pellets prior to introducing the carbon black masterbatch to the thermoplastic vulcanizate.

Embodiment 17

The method of Embodiment 16, wherein blending the carbon black masterbatch with the thermoplastic vulcanizate comprises melt-mixing the thermoplastic vulcanizate pellets with the carbon black masterbatch.

Embodiment 18

The method of any one of Embodiments 14-17, further comprising melt-mixing the propylene-α-olefin copolymer and the carbon black, and forming a plurality of masterbatch pellets comprising the carbon black dispersed in the propylene-α-olefin copolymer carrier resin, such that the masterbatch pellets are used as the carbon black masterbatch that is introduced to the thermoplastic vulcanizate.

Embodiment 19

The method of any one of Embodiments 14-18, further comprising passing the thermoplastic vulcanizate through a 200 U.S. Mesh or finer screen after introducing the carbon black masterbatch.

Embodiment 20

The method of any one of Embodiments 14-19, wherein the thermoplastic vulcanizate comprises less than or equal to 4 wt % of the propylene-α-olefin copolymer, by weight of the thermoplastic vulcanizate, after introducing the carbon black masterbatch.

Embodiment 21

The method according to any one of Embodiments 1-13, wherein the thermoplastic vulcanizate has a surface spot count less than or equal to 9 blemishes in a 1 in.×18 in. extruded strip of the thermoplastic vulcanizate.

Embodiment 22

The method according to any one of Embodiments 1-13 and 21, wherein the thermoplastic vulcanizate has an extrusion throughput rate that is about 2% to about 15% faster as compared to an otherwise identical thermoplastic vulcanizate in which all carrier resin comprising the propylene- or ethylene-based copolymer is instead a homopolypropylene carrier resin.

Embodiment 23

The method according to any one of Embodiments 14-20, wherein the thermoplastic vulcanizate has a surface spot count less than or equal to 9 blemishes in a 1 in.×18 in. extruded strip of the thermoplastic vulcanizate.

Embodiment 24

The method according to any one of Embodiments 14-20 and 23, wherein the thermoplastic vulcanizate has an extrusion throughput rate that is about 2% to about 15% faster as compared to an otherwise identical thermoplastic vulcanizate in which all carrier resin comprising the propylene-α-olefin copolymer is instead a homopolypropylene carrier resin.

Embodiment 25

A thermoplastic vulcanizate formed according to any of the foregoing Embodiments.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention. Further, the term "comprising" is considered synonymous with the term "including" for purposes of Australian law. Likewise whenever a composition, an element or a group of elements is preceded with the transitional phrase "comprising," it is understood that we also contemplate the same composition or group of elements with transitional phrases "consisting essentially of," "consisting of," "selected from the group consisting of," or "is" preceding the recitation of the composition, element, or elements and vice versa. Furthermore, all patents, articles, and other documents specifically referenced are hereby incorporated by reference.

The invention claimed is:

1. A method for preparing a thermoplastic vulcanizate, the method comprising:
   dynamically vulcanizing at least a portion of an elastomer component in the presence of a thermoplastic resin and a curing agent so as to form a thermoplastic vulcanizate wherein the elastomer component is at least partially vulcanized and is dispersed in a continuous phase comprising the thermoplastic resin; and
   introducing a carbon black masterbatch into the thermoplastic vulcanizate, wherein the carbon black masterbatch comprises carbon black particulates dispersed in a carrier resin comprising a propylene-α-olefin copolymer, the propylene-α-olefin copolymer comprising about 50 wt % to about 99 wt % propylene-derived units and about 1 wt % to about 35 wt % comonomer units derived from one of ethylene and a $C_4$-$C_{10}$ alpha-olefin, and having a heat of fusion of about 75 J/g or less.

2. The method of claim 1, wherein introducing the carbon black masterbatch into the thermoplastic vulcanizate comprises blending the carbon black masterbatch with the thermoplastic vulcanizate while the thermoplastic vulcanizate remains in a molten state following the dynamic vulcanization.

3. The method of claim 1, further comprising pelletizing the thermoplastic vulcanizate so as to form a plurality of thermoplastic vulcanizate pellets prior to introducing the carbon black masterbatch to the thermoplastic vulcanizate.

4. The method of claim 3, wherein introducing the carbon black masterbatch with the thermoplastic vulcanizate comprises melt-mixing the thermoplastic vulcanizate pellets with the carbon black masterbatch.

5. The method of claim 1, further comprising melt-mixing the propylene-α-olefin copolymer and the carbon black, and forming a plurality of masterbatch pellets comprising the carbon black dispersed in the propylene-α-olefin copolymer carrier resin, such that the masterbatch pellets are used as the carbon black masterbatch that is introduced to the thermoplastic vulcanizate.

6. The method of claim 1, further comprising passing the thermoplastic vulcanizate through a 200 U.S. Mesh (74 micron) or finer screen after introducing the carbon black masterbatch.

7. The method of claim 1, wherein the thermoplastic vulcanizate comprises less than or equal to 4 wt % of the propylene-α-olefin copolymer, by weight of the thermoplastic vulcanizate, after introducing the carbon black masterbatch.

8. The method of claim 1, wherein the thermoplastic vulcanizate has a surface spot count less than or equal to 9 blemishes in a 1 in.×18 in. (2.54 cm×45.72 cm) extruded strip of the thermoplastic vulcanizate.

9. The method of claim 1, wherein the thermoplastic vulcanizate has an extrusion throughput rate that is about 2% to about 15% faster as compared to an otherwise identical thermoplastic vulcanizate in which all carrier resin comprising the propylene-α-olefin copolymer is instead a homopolypropylene carrier resin.

10. A thermoplastic vulcanizate formed according to the method of claim 1.

* * * * *